(12) United States Patent
Blondel

(10) Patent No.: US 10,407,570 B2
(45) Date of Patent: Sep. 10, 2019

(54) IMPACT-RESISTANT THERMOPLASTIC COMPOSITION

(71) Applicant: ARKEMA FRANCE, Colombes (FR)

(72) Inventor: Philippe Blondel, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/034,430

(22) PCT Filed: Nov. 3, 2014

(86) PCT No.: PCT/FR2014/052786
§ 371 (c)(1),
(2) Date: May 4, 2016

(87) PCT Pub. No.: WO2015/067880
PCT Pub. Date: May 14, 2015

(65) Prior Publication Data
US 2016/0280915 A1    Sep. 29, 2016

(30) Foreign Application Priority Data

Nov. 5, 2013  (FR) ...................................... 13 60803

(51) Int. Cl.
*C08L 77/02* (2006.01)
*C08L 51/06* (2006.01)
*C08L 77/12* (2006.01)

(52) U.S. Cl.
CPC .............. *C08L 77/02* (2013.01); *C08L 51/06* (2013.01); *C08L 77/12* (2013.01)

(58) Field of Classification Search
CPC ....... C08L 77/02; C08L 51/006; C08L 51/003
See application file for complete search history.

(56) References Cited

U.S. PATENT DOCUMENTS

| | | | |
|---|---|---|---|
| 2,705,227 A | 3/1955 | Stamatoff | |
| 4,115,475 A | 9/1978 | Foy et al. | |
| 4,195,015 A | 5/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,839,441 A | 6/1989 | Cuzin et al. | |
| 4,864,014 A | 9/1989 | Cuzin et al. | |
| 5,140,065 A | 8/1992 | Dalla Torre et al. | |
| 6,051,649 A * | 4/2000 | Alex .......................... | C08J 5/18 525/179 |
| 2002/0173596 A1 | 11/2002 | Montanari et al. | |
| 2005/0014842 A1 | 1/2005 | Baumann et al. | |
| 2012/0279605 A1 | 11/2012 | Nozaki et al. | |
| 2013/0172484 A1 | 7/2013 | Zhang et al. | |

FOREIGN PATENT DOCUMENTS

| | | |
|---|---|---|
| EP | 0 342 066 | 11/1989 |
| EP | 0 389 998 A2 | 10/1990 |
| EP | 0 560 630 A1 | 9/1993 |
| EP | 0 564 338 | 10/1993 |
| EP | 0 787 761 | 8/1997 |
| EP | 0 787 771 | 8/1997 |
| EP | 1 227 131 A1 | 7/2002 |
| EP | 1 518 901 A2 | 3/2005 |
| EP | 1 884 356 A1 | 2/2008 |

OTHER PUBLICATIONS

International Search Report (PCT/ISA/210) dated Feb. 6, 2015, by the European Patent Office as the International Searching Authority for International Application No. PCT/FR2014/052786.

* cited by examiner

*Primary Examiner* — Jeffrey C Mullis
(74) *Attorney, Agent, or Firm* — Thomas F. Roland

(57) ABSTRACT

A composition including at least one polyamide; at least one copolymer including polyamide blocks and polyether blocks; and a single polyolefin, said polyolefin being a polyolefin functionalized by maleic anhydride units or by epoxy units. Also, objects manufactured from this composition and to the associated manufacturing process of the composition.

10 Claims, No Drawings

IMPACT-RESISTANT THERMOPLASTIC COMPOSITION

FIELD OF THE INVENTION

The present invention relates to an impact-resistant thermoplastic composition and to its use in the manufacture of various parts.

TECHNICAL BACKGROUND

It is known to use polymer compositions to manufacture all kinds of articles, such as footwear soles, for example. Copolymers comprising polyamide blocks and polyether blocks are particularly advantageous in applications of this type. However, they exhibit a relatively high cost and the impact strength is sometimes too low.

It is also known to use these copolymers comprising polyamide blocks and polyether blocks as a blend with other polymers.

For example, the documents EP 0 787 761 and EP 0 787 771 describe quaternary compositions based on polyamide, on copolymer comprising polyamide blocks and polyether blocks, on polyolefin and on functionalized polyolefin. However, these compositions still exhibit an impact strength which can be too low.

The document US 2013/0172484 teaches a composition comprising a polyamide, a copolymer comprising polyamide blocks and polyether blocks, a functionalized ethylene/olefin copolymer and a functionalized ethylene/propylene copolymer.

Furthermore, the document EP 0 564 338 teaches a composition based on polyamide resin and comprising at least one ethylene polymer having unsaturated epoxide-derived units.

There exists a need to develop a polymer composition which exhibits a high impact strength and which is simple to process.

SUMMARY OF THE INVENTION

The invention relates first to a composition comprising:
at least one polyamide (A);
at least one copolymer (B) comprising polyamide blocks and polyether blocks;
a single polyolefin (C), said polyolefin being a polyolefin functionalized by maleic anhydride units or by epoxy units.

According to one embodiment, the composition comprises:
from 5 to 50%, preferably from 10 to 45%, of polyamide (A);
from 35 to 60%, preferably from 45 to 55%, of copolymer (B);
from 5 to 40%, preferably from 10 to 35%, of polyolefin (C);
from 0 to 35% of additives.

According to one embodiment, the polyamide (A) is chosen from PA 6, PA 11, PA 12, PA 10.10, PA 10.12, PA 6.10, PA 6.12 and the combinations of these.

According to one embodiment, the polyolefin (C) is chosen from poly(ethylene/propylene)s grafted with maleic anhydride, poly-(styrene/ethylene)s grafted with maleic anhydride and poly-(ethylene/acrylate)s grafted with maleic anhydride.

According to one embodiment, the copolymer (B) is chosen from copolymers comprising PA 6 blocks and poly-tetramethylene glycol blocks, copolymers comprising PA BACM.12 blocks and polytetramethylene glycol blocks and the combinations of these.

According to one embodiment, the polyamide (A) is a PA 6 and/or the copolymer (B) is a copolymer comprising PA 6 and polytetramethylene glycol blocks.

Another subject matter of the invention is a process for the manufacture of the composition described above, comprising the provision of the polyamide (A), of the copolymer (B) and of the single polyolefin (C) and the blending of these, preferably by compounding.

The invention also relates to an object manufactured from the composition described above.

The invention also relates to a process for the manufacture of this object, comprising the provision of the composition and the forming of the object, preferably by injection molding.

The present invention makes it possible to overcome the disadvantages of the state of the art. It more particularly provides a polymer composition which exhibits a high impact strength and which is simple to process. The composition according to the invention is particularly well suited to the injection molding process.

This is accomplished by virtue of a combination of at least one polyamide (A), of at least one copolymer (B) comprising polyamide blocks and polyether blocks and of a single polyolefin (C) which is a polyolefin functionalized by maleic anhydride units or by epoxy units.

Such a composition is simpler to process than the compositions described in the document US 2013/0172484, which provides a blend of two different functionalized polyolefins.

The composition according to the invention provides a material having properties similar to those of polyurethane thermoplastics or copolymers comprising polyamide and polyether blocks, at a moderate cost (and in any case lower than that of the copolymers comprising polyamide and polyether blocks taken individually).

The composition according to the invention also exhibits a high elongation at break, a low density and a lower sensitivity to water than certain products of the art, a low flexural modulus and good flex fatigue properties, for example.

DESCRIPTION OF EMBODIMENTS OF THE INVENTION

The invention is now described in more detail and without implied limitation in the description which follows.

The percentages shown correspond to proportions by weight, unless otherwise indicated.

The invention provides a composition comprising:
at least one polyamide (A);
at least one copolymer (B) comprising polyamide blocks and polyether blocks;
a single polyolefin (C), said polyolefin being a polyolefin functionalized by maleic anhydride units or by epoxy units; and
optionally additives.

The term "single polyolefin" is understood to mean that the composition comprises a polyolefin corresponding to just one formula (it being understood that the individual molecules of this polyolefin in the composition can be subject to a random distribution, in particular with an average molecular weight, an average degree of grafting, and the like).

In particular, the composition is devoid of nonfunctionalized polyolefin and the composition comprises either a polyolefin functionalized by maleic anhydride units or a polyolefin functionalized by epoxy units but not a blend of the two.

The polyamide (A) can be a semicrystalline or amorphous polyamide prepared in a way known in the art of the polyamides.

Blends of semicrystalline and/or amorphous polyamides can also be used in the context of the present invention. In this case, the blends in which the polyamide(s) (A) are predominantly (to more than 50% by weight) semicrystalline are preferred.

The polyamides are generally manufactured by polycondensation of starting monomers which can either be an amino acid or a lactam or a mixture of a diacid and of a diamine.

Mention may be made, as examples of starting monomer in the manufacture of the polyamides (PA) which can be used in the invention, of the following monomers, nonlimiting, their common abbreviation appearing in brackets:

aliphatic diacids, such as adipic acid (6), azelaic acid (9), sebacic acid (10), dodecanedioic acid (12) and the like, or aromatic diacids, such as terephthalic acid (T), isophthalic acid (I), and the like;

aliphatic diamines, such as butylenediamine (4), hexamethylene-diamine (6 or HMDA), isomers of trimethylhexamethylenediamine (TMHMDA), octamethylenediamine (8), decamethylenediamine (10), dodecamethylenediamine (12), and the like, or aromatic diamines, such as meta-xylenediamine (MXD), or cycloaliphatic diamines, such as isomers of bis(4-aminocyclohexyl)methane (BACM), bis(3-methyl-4-aminocyclohexyl)methane (BMACM), 2,2-bis(3-methyl-4-aminocyclohexyl)propane (BMACP), and the like, or other diamines, such as isophoronediamine (IPDA), 2,6-bis-(aminomethyl)norbornane (BAMN), and the like;

lactams, such as caprolactam (L6), lauryllactam (L12), and the like;

amino acids, such as 11-aminoundecanoic acid (11), 11-(N-heptyl-amino)undecanoic acid (NHAU), and the like.

The polyamides of the invention can be aliphatic or semiaromatic polyamides.

Mention may be made, among aliphatic polyamides, without implied limitation, of: polycaprolactam (PA 6), polyundecanamide (PA 11), poly-lauryllactam (PA 12), polybutylene adipamide (PA 4.6), polyhexamethylene adipamide (PA 6.6), polyhexamethylene azelamide (PA 6.9), polyhexamethylene sebacamide (PA 6.10), polyhexamethylene dodecanediamide (PA 6.12), polydecamethylene dodecanediamide (PA 10.12), polydecamethylene sebacamide (PA 10.10), polydodecamethylene dodecanediamide (PA 12.12), the polyamides and copolyamides PA 11/NHUA, PA BACM.6, PA BACM.10, PA BACM.12, PA 6/6.6, PA 6/12 and their blends.

Mention may be made, among semiaromatic polyamides, without implied limitation, of: PA 6/6.T, PA 6.6/6.T, PA 6.T/6.I, PA 6.6/6.T/6.I, PA 11/6.T, PA 12/6.T, PA MXD.6, PA MXD.10 and their blends.

Mention may be made, among amorphous polyamides, without implied limitation, of the following polyamides and copolyamides: polyhexamethylene isophthalamide (PA 6.I), polytrimethylhexamethylene terephthalamide (PA TMHMDA.T), PA BACM.12, the copolyamides PA 6/BMACP.I, PA 6/BAMN.T, PA 11/BMACM.I, PA 11/BMACM.T/ BMACM.I, PA 11/BACM.I/IPDA.I, PA 12/BMACM.I, PA 12/BACM.T/BACM.I, PA 12/BMACM.T/BMACM.I, PA 12/BACM.I/IPDA.I, PA 6.T/6.I/BACM.I, PA 6.T/6.I/BACM.T/BACM.I and their blends.

According to a preferred embodiment, the polyamide (A) is a semicrystalline polyamide. "Semicrystalline polyamides", within the meaning of the invention, is understood to mean generally linear aliphatic polyamides. Among semicrystalline polyamides, preference is given to those chosen from PA 6, PA 11, PA 12, PA 10.10, PA 10.12, PA 6.10, PA 6.12 and the combination of these.

PA 6 is preferred.

The copolymer (B) comprising polyamide blocks and polyether blocks is a copolymer resulting from the copolycondensation of polyamide blocks comprising reactive ends with polyether blocks comprising reactive ends, such as, inter alia:

polyamide blocks comprising diamine chain ends with polyoxyalkylene blocks comprising dicarboxyl chain ends;

polyamide blocks comprising dicarboxyl chain ends with polyoxyalkylene blocks comprising diamine chain ends, which are obtained by cyanoethylation and hydrogenation of aliphatic α,ω-dihydroxylated polyoxyalkylene blocks, known as polyetherdiols;

polyamide blocks comprising dicarboxyl chain ends with polyetherdiols, the products obtained being, in this specific case, polyetheresteramides.

The polyamide blocks comprising dicarboxyl chain ends originate, for example, from the condensation of α,ω-aminocarboxylic acids, of lactams or of dicarboxylic acids and diamines in the presence of a chain-limiting dicarboxylic acid. Advantageously, the polyamide blocks are of polyamide 12 or of polyamide 6.

The number-average molar mass of the polyamide blocks is advantageously between 300 and 15 000, preferably between 600 and 5000. The number-average molar mass of the polyether blocks is between 100 and 6000 and preferably between 200 and 3000.

The polymers comprising polyamide blocks and polyether blocks can also comprise randomly distributed units. These polymers can be prepared by the simultaneous reaction of the polyether and of the precursors of the polyamide blocks.

For example, it is possible to react polyetherdiol, a lactam (or an α,ω-amino acid) and a chain-limiting diacid in the presence of a small amount of water. A polymer is obtained which has essentially polyether blocks and polyamide blocks of highly variable length but also various reactants which have reacted randomly and which are distributed statistically along a polymer chain.

These polymers comprising polyamide blocks and polyether blocks, whether they originate from the copolycondensation of polyamide and polyether blocks prepared previously or from a single-stage reaction, exhibit, for example, Shore D hardnesses which can be between 20 and 75 and advantageously between 30 and 70 and an intrinsic viscosity between 0.8 and 2.5, measured in meta-cresol at 25° C.

Whether the polyether blocks derive from polyethylene glycol, polypropylene glycol or polytetramethylene glycol, they are either used as is and copolycondensed with polyamide blocks comprising carboxyl ends or they are aminated in order to be converted into polyether diamines and condensed with polyamide blocks comprising carboxyl ends. They can also be mixed with polyamide precursors and a chain-limiting agent in order to form polymers comprising polyamide blocks and polyether blocks having statistically distributed units.

Polymers comprising polyamide and polyether blocks are described in the patents U.S. Pat. Nos. 4,331,786, 4,115,475, 4,195,015, 4,839,441, 4,864,014, 4,230,838 and 4,332,920.

The polyether can, for example, be a polyethylene glycol (PEG), a polypropylene glycol (PPG) or a polytetramethylene glycol (PTMG); the latter is also known as polytetrahydrofuran (PTHF).

Whether the polyether blocks are introduced into the chain of the polymer comprising polyamide blocks and polyether blocks in the form of diols or of diamines, they are referred to for simplicity as PEG blocks or PPG blocks or alternatively PTMG blocks.

It would not be departing from the scope of the invention if the polyether blocks contained different units, such as units derived from ethylene glycol ($-OC_2H_4-$), from propylene glycol ($-O-CH_2-CH(CH_3)-$), or alternatively from tetramethylene glycol ($-O-(CH_2)_4-$).

Preferably, the polyamide blocks comprise the same units as the polyamide (A).

Preferably, the polymer comprising polyamide blocks and polyether blocks comprises just one type of polyamide block and just one type of polyether block.

Use is advantageously made of polymers comprising PA 6 blocks and PTMG blocks.

Use may also be made of a blend of two polymers comprising polyamide blocks and polyether blocks.

Advantageously, the polymer comprising polyamide blocks and polyether blocks is such that the polyamide is the predominant constituent by weight, that is to say that the amount of polyamide which is in the form of blocks and that which is possibly statistically distributed in the chain represents 50% by weight or more of the polymer comprising polyamide blocks and polyether blocks.

Advantageously, the amount of polyamide and the amount of polyether are in the polyamide/polyether ratio from 50/50 to 80/20.

Preferably, the polyamide blocks and the polyether blocks of one and the same polymer (B) respectively have number-average molar masses of 1000/1000, 1300/650, 2000/1000, 2600/650 and 4000/1000.

The functionalized polyolefin (C) is an olefin polymer having reactive units: the functionalities. Such reactive units are the maleic anhydride or epoxy functional groups.

Mention may be made, by way of examples, as polyolefins, of homopolymers or copolymers of α-olefins or diolefins, such as, for example, ethylene, propylene, 1-butene, 1-octene, butadiene and more particularly:

homopolymers and copolymers of ethylene, in particular LDPE (low-density polyethylene), HDPE (high-density polyethylene), LLDPE (linear low-density polyethylene), VLDPE (very-low-density polyethylene) and metallocene polyethylene, homopolymers or copolymers of propylene, ethylene/α-olefin copolymers, such as ethylene/propylene, EPRs (ethylene/propylene rubber) and EPDMs (terpolymer based on ethylene/propylene/diene), styrene/ethylene-butylene/styrene (SEBS), styrene/butylene/styrene (SBS), styrene/isoprene/styrene (SIS) or styrene/ethylene-propylene/styrene (SEPS) block copolymers, copolymers of ethylene with at least one product chosen from the salts or esters of unsaturated carboxylic acids, such as alkyl (meth)acrylate (for example methyl, ethyl or butyl acrylate, for example those of the Lotader® range from Arkema) or vinyl esters of saturated carboxylic acids, such as vinyl acetate (EVA), it being possible for the proportion of comonomer to reach 40% by weight.

These polyolefins described above can be grafted, copolymerized or terpolymerized with reactive units (the functionalities), namely maleic anhydride or epoxy functional groups.

More particularly, these polyolefins can be grafted or co- or terpolymerized with unsaturated epoxides, such as glycidyl (meth)acrylate, or with maleic anhydride.

The functionalized polyolefin (C) can be chosen from the following (co)polymers, grafted with maleic anhydride or glycidyl methacrylate, in which the degree of grafting is, for example, from 0.01 to 5% by weight:

PE (polyethylene), PP (polypropylene) or copolymers of ethylene with propylene, butene, hexene, or octene comprising, for example, from 35 to 80% by weight of ethylene;

ethylene/α-olefin copolymers, such as ethylene/propylene copolymers, EPRs and EPDMs, SEBS, SBS, SIS or SEPS block copolymers, EVA copolymers comprising up to 40% by weight of vinyl acetate, ethylene and alkyl (meth)acrylate copolymers comprising up to 40% by weight of alkyl (meth)acrylate (for example those of the Lotader® range from Arkema), ethylene and EVA and alkyl (meth)acrylate copolymers comprising up to 40% by weight of comonomers.

The functionalized polyolefin can, for example, be a PE/EPR blend, the ratio by weight of which can vary within wide limits, for example between 40/60 and 90/10, said blend being cografted with a maleic anhydride according to the degree of grafting, for example, of 0.01 to 5% by weight.

The functionalized polyolefin (C) can also be chosen from ethylene/propylene copolymers predominant in propylene grafted with maleic anhydride and then condensed with monoaminated polyamide (or a polyamide oligomer) (products described in EP-A-0 342 066).

The functionalized polyolefin (C) can also be a co- or terpolymer of at least the following units:
(1) ethylene,
(2) alkyl (meth)acrylate or saturated carboxylic acid vinyl ester and
(3) maleic anhydride or epoxy, such as glycidyl (meth) acrylate.

Mention may be made, as examples of functionalized polyolefins of the latter type, of the following copolymers, where ethylene preferably represents at least 60% by weight and where the termonomer represents, for example, from 0.1 to 12% by weight of the copolymer:

ethylene/alkyl (meth)acrylate/maleic anhydride or glycidyl methacrylate copolymers;

ethylene/vinyl acetate/maleic anhydride or glycidyl methacrylate copolymers;

ethylene/vinyl acetate or alkyl (meth)acrylate/maleic anhydride or glycidyl methacrylate copolymers.

The term "alkyl (meth)acrylate" denotes $C_1$ to $C_6$ alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Furthermore, the abovementioned polyolefins (C) can also be crosslinked by any appropriate process or agent (diepoxy, diacid, peroxide, and the like).

The abovementioned polyolefins (C) can be copolymerized in statistical or block fashion and can exhibit a linear or branched structure.

The molecular weight, melt flow index (MFI) and the density of these polyolefins can also vary to a large extent, which a person skilled in the art will perceive. The MFI index is measured according to the standard ASTM 1238.

Advantageously, the functionalized polyolefins (C) are chosen from any polymer comprising α-olefin units and units carrying polar reactive functional groups which are the epoxy or maleic anhydride functional groups. Mention may be made, as examples of such polymers, of terpolymers of ethylene, alkyl acrylate and maleic anhydride or glycidyl methacrylate, such as the compounds of the Lotader® range sold by Arkema, or polyolefins grafted with maleic anhydride, such as the compounds of the Orevac® range sold by Arkema. Mention may also be made of homopolymers or copolymers of propylene grafted with maleic anhydride and then condensed with monoaminated polyamides or polyamide oligomers, as described in the application EP 0 342 066.

More particularly, the functionalized polyolefins (C) can be:
- terpolymers of ethylene, alkyl acrylate and maleic anhydride;
- terpolymers of ethylene, alkyl acrylate and glycidyl methacrylate;
- polypropylenes and polyethylenes grafted with maleic anhydride;
- copolymers of ethylene and propylene and optionally of diene monomer grafted with maleic anhydride;
- copolymers of ethylene and octene grafted with maleic anhydride.

The additives (D), when they are present, can in particular comprise fillers, processing aids, stabilizers, colorants, mold-release agents, flame retardants, surface-active agents, optical brighteners and their mixtures.

Mention may be made, among the fillers, of silica, graphite, expanded graphite, carbon black, glass beads, kaolin, magnesia, slag, talc, nanofillers (carbon nanotubes), pigments, metal oxides (titanium oxide), metals or fibers (aramid, glass or carbon fibers).

Depending on the nature of the fillers, the amount of the latter can represent up to 35% by weight, advantageously up to 30% by weight, of the total weight of the composition, and for example from 5 to 30% or from 20 to 30% by weight. The fillers, such as expanded graphite, for example, can make it possible to increase the thermal conductivity of the material (for example in order to promote an exchange of heat between an opening of a pipe comprising a layer of composition of the invention and the outside or between two openings of a pipe comprising a layer of composition of the invention).

The fibers can, for example, have a length of 0.05 to 1 mm and in particular of 0.1 to 0.5 mm. Their mean diameter can be from 5 to 20 µm, preferably from 6 to 14 µm.

Mention may be made, among the processing aids, of stearates, such as calcium stearate or zinc stearate, natural waxes or polymers comprising tetrafluoroethylene (TFE).

The proportion by weight of processing aids is conventionally between 0.01 and 0.3% by weight and advantageously between 0.02 and 0.1% by weight, with respect to the total weight of the composition.

Mention may in particular be made, among the colorants, of carbon black. The colorants or pigments can be present, for example, at a level of 0.1 to 0.2% by weight.

A heat stabilizer can be present in an amount of 0 to 4%, in particular of 0.01 to 2% or of 0.1 to 0.3% by weight, with respect to the total weight of the composition.

It can be a copper-comprising heat stabilizer.

More particularly, it can be a copper salt or a copper salt derivative, for example copper iodide, copper bromide, copper halides, derivatives or mixtures of these. Copper(I) salts are preferred. Examples are copper iodide, copper bromide, copper chloride, copper fluoride, copper thiocyanate, copper nitrate, copper acetate, copper naphthenate, copper caprate, copper laurate. copper stearate, copper acetylacetonate or copper oxide. Copper iodide, copper bromide, copper chloride and copper fluoride are preferred.

It is also possible to provide, as heat stabilizer, a metal halide salt in combination with LiI, NaI, KI, MgI$_2$, KBr or CaI$_2$. KI and KBr are preferred.

Preferably, the copper-comprising heat stabilizer is a mixture of potassium iodide and copper iodide (KI/CuI).

Preferably, the mixture of potassium iodide and copper iodide of use according to the present invention is in a ratio from 90/10 to 70/30.

An example of such a stabilizer is Polyadd P201 from Ciba.

Fuller details with regard to copper-based stabilizers will be found in the patent U.S. Pat. No. 2,705,227.

It is also possible to use complexed coppers, such as Bruggolen H3336, H3337 and H3373 from Brueggemann.

Preferably, the composition of the invention comprises from 0.10 to 0.25% by weight of copper-comprising heat stabilizer.

Other possible heat stabilizers are sterically hindered phenolic antioxidants. These compounds are described in detail in the document US 2012/0279605, in sections [0025] and [0026], to which sections reference is expressly made here.

However, according to an alternative embodiment, the composition of the invention is devoid of such hindered phenolic antioxidants.

Another category of possible stabilizers is the UV stabilizers based on sterically hindered amine (or HALS), which are derivates of 2,2,6,6-tetramethylpiperidine. They can be used, for example, in a range from 0 to 1% or from 0.01 to 0.5%.

It may happen that one of the abovementioned additives fortuitously contributes a polyolefin to the composition, in addition to the polyolefin (C) described above. In such a case, this additional contribution of polyolefin is preferably less than 1%, more particularly less than 0.5% or less than 0.2% or less than 0.1%, with respect to the total weight of the composition.

The composition of the invention can be prepared by any method which makes it possible to obtain a homogeneous blend, such as melt extrusion, compacting or roll blending.

More particularly, the composition of the invention can be prepared by melt blending the compounds (A), (B) and (C).

The optional additives can, for their part, be introduced at the same time or optionally during a subsequent stage.

The composition according to the invention comprises or is essentially composed of or consists of:
- from 5 to 50% of polyamide (A);
- from 35 to 60% of copolymer (B);
- from 5 to 40% of the single polyolefin (C);
- from 0 to 35% of additives.

According to a preferred embodiment, the composition according to the invention comprises or is essentially composed of or consists of:

from 10 to 45% of polyamide (A);
from 45 to 55% of copolymer (B);
from 10 to 35% of the single polyolefin (C);
from 0 to 35% of additives.

Examples of formulations for the composition according to the invention appear in the table below (the amount of additives not being specified):

| Formulation No. | Polyamide A | Copolymer B | Polyolefin C |
|---|---|---|---|
| 1 | 10 to 15% | 45 to 50% | 10 to 15% |
| 2 | 10 to 15% | 45 to 50% | 15 to 20% |
| 3 | 10 to 15% | 45 to 50% | 20 to 25% |
| 4 | 10 to 15% | 45 to 50% | 25 to 30% |
| 5 | 10 to 15% | 45 to 50% | 30 to 35% |
| 6 | 10 to 15% | 50 to 55% | 10 to 15% |
| 7 | 10 to 15% | 50 to 55% | 15 to 20% |
| 8 | 10 to 15% | 50 to 55% | 20 to 25% |
| 9 | 10 to 15% | 50 to 55% | 25 to 30% |
| 10 | 10 to 15% | 50 to 55% | 30 to 35% |
| 11 | 15 to 20% | 45 to 50% | 10 to 15% |
| 12 | 15 to 20% | 45 to 50% | 15 to 20% |
| 13 | 15 to 20% | 45 to 50% | 20 to 25% |
| 14 | 15 to 20% | 45 to 50% | 25 to 30% |
| 15 | 15 to 20% | 45 to 50% | 30 to 35% |
| 16 | 15 to 20% | 50 to 55% | 10 to 15% |
| 17 | 15 to 20% | 50 to 55% | 15 to 20% |
| 18 | 15 to 20% | 50 to 55% | 20 to 25% |
| 19 | 15 to 20% | 50 to 55% | 25 to 30% |
| 20 | 15 to 20% | 50 to 55% | 30 to 35% |
| 21 | 20 to 25% | 45 to 50% | 10 to 15% |
| 22 | 20 to 25% | 45 to 50% | 15 to 20% |
| 23 | 20 to 25% | 45 to 50% | 20 to 25% |
| 24 | 20 to 25% | 45 to 50% | 25 to 30% |
| 25 | 20 to 25% | 45 to 50% | 30 to 35% |
| 26 | 20 to 25% | 50 to 55% | 10 to 15% |
| 27 | 20 to 25% | 50 to 55% | 15 to 20% |
| 28 | 20 to 25% | 50 to 55% | 20 to 25% |
| 29 | 20 to 25% | 50 to 55% | 25 to 30% |
| 30 | 25 to 30% | 45 to 50% | 10 to 15% |
| 31 | 25 to 30% | 45 to 50% | 15 to 20% |
| 32 | 25 to 30% | 45 to 50% | 20 to 25% |
| 33 | 25 to 30% | 45 to 50% | 25 to 30% |
| 34 | 25 to 30% | 50 to 55% | 10 to 15% |
| 35 | 25 to 30% | 50 to 55% | 15 to 20% |
| 36 | 25 to 30% | 50 to 55% | 20 to 25% |
| 37 | 30 to 35% | 45 to 50% | 10 to 15% |
| 38 | 30 to 35% | 45 to 50% | 15 to 20% |
| 39 | 30 to 35% | 45 to 50% | 20 to 25% |
| 40 | 30 to 35% | 50 to 55% | 10 to 15% |
| 41 | 30 to 35% | 50 to 55% | 15 to 20% |
| 42 | 35 to 40% | 45 to 50% | 10 to 15% |
| 43 | 35 to 40% | 45 to 50% | 15 to 20% |
| 44 | 35 to 40% | 50 to 55% | 10 to 15% |
| 45 | 40 to 45% | 45 to 50% | 10 to 15% |

Advantageously, the composition can be obtained in form of granules by compounding, in particular using a twin-screw extruder, a co-kneader or an internal mixer.

These granules of the composition of the invention, obtained by the preparation process described above, can subsequently be converted using devices known to a person skilled in the art (such as an injection-molding press or an extruder), in particular in the form of pipes, films and/or molded objects.

Use may also be made of a twin-screw extruder feeding, without intermediate granulation, an injection-molding press or an extruder, in particular for the preparation of pipes, films and/or molded objects.

The objects capable of being manufactured with the composition according to the invention are in particular footwear, medical devices, sports equipment, motor vehicle parts, mechanical tools, electronic products or components or parts of the preceding products.

The articles or objects according to the invention can be obtained from the above composition by a known conversion process, such as injection molding, extrusion, extrusion-blow molding, coextrusion or multi-injection molding. Preferably, injection molding or multi-injection molding is used.

EXAMPLES

The following examples illustrate the invention without limiting it. Various compositions are formulated by compounding on a twin-screw extruder (Evolum 32, 35 kg/h at 300 rev/min).

The starting materials which are used are as follows:

Pebax 5513: copolymer comprising PA 6 and PTMG blocks, sold by Arkema (reference MP 1878).

Lotader AX8900: poly(ethylene/methyl acrylate) grafted with glycidyl methacrylate, sold by Arkema.

Lotader 4700: poly(ethylene/ethyl acrylate) grafted with maleic anhydride, sold by Arkema.

Lucalene 3110 M: poly(ethylene/butyl acrylate) grafted with carboxylic acid, sold by LyondellBasell.

EPR VA 1801: poly(ethylene/propylene) grafted with maleic anhydride, sold by Exxon.

EVA 2403: poly(ethylene/vinyl acetate), sold by Arkema.

SEBS FG 1924X: poly(styrene/ethylene-butylene/styrene), sold by Univar (Kraton).

Lotryl 24MA005: poly(ethylene/acrylate), sold by Arkema.

Lotader 3410: poly(ethylene butyl acrylate) grafted with maleic anhydride, sold by Arkema.

Ultramid B27E: polyamide 6, sold by BASF.

The compositions C1 to C4 represent comparative examples, comprising both a nonfunctionalized polyolefin and a functionalized polyolefin (C1 to C3) or representing only a block copolymer (C4). The compositions E1 to E5 are examples according to the invention.

Various tests are carried out on the compositions prepared:

Flow index (MFI) at 235° C. and under 2.16 kg, measured according to the standard ASTM 1238.

Morphology (Dv): particle size in µm. Observation is carried out with a scanning electronic microscope on facies of rods after cryogenic fracturing with extraction of the dispersed phase with chloroform at 50° C. for 30 min. The Dv corresponds to the mean diameter by volume (in µm).

Elongation at break (ΔL) as %, measured according to the tension standard ISO 527 1A.

Conditioned flexural modulus (W), measured according to the standard ISO 178-93.

Charpy impact at −40° C. (Charpy −40° C.) in $kJ/m^2$, measured according to the standard ISO 179-1eA.

Charpy impact at −30° C. (Charpy −30° C.) in $kJ/m^2$, measured according to the standard ISO 179-1eA.

Density, measured according to the standard ISO 1183.

The respective formulations of the various compositions and the results of the test are summarized in the table below.

|  | C1 | C2 | C3 | C4 | E1 | E2 | E3 | E4 | E5 |
|---|---|---|---|---|---|---|---|---|---|
| Formulations | | | | | | | | | |
| Pebax 5513 | 50% | 50% | 20% | 100% | 50% | 50% | 50% | 50% | 45% |
| Lotader AX8900 | — | — | 8.8% | — | — | — | — | — | — |
| Lotader 4700 | — | — | 20.3% | — | — | — | — | — | — |
| Lucalene 3110 | — | — | 10.2% | — | — | — | — | — | — |
| EPR VA 1801 | — | — | — | — | — | 33% | — | 25% | 25% |
| EVA 2403 | — | 25% | — | — | — | — | — | — | — |
| SEBS FG 1924X | — | — | — | — | 33% | — | — | — | — |
| Lotryl 24MA05 | 25% | — | — | — | — | — | — | — | — |
| Lotader 3410 | 8% | 8% | — | — | — | — | 33% | — | — |
| Ultramid B27E | 17% | 17% | 40% | — | 17% | 17% | 14% | 25% | 30% |
| Results of the tests | | | | | | | | | |
| MFI | 12.6 | 14.1 | <1 | 23 | 7.9 | 4.2 | 11.75 | 8.15 | 7.5 |
| Dv | 1.09 | 1.17 | Cocontinuous | — | 0.57 | 0.76 | 0.45 | 0.65 | 0.49 |
| ΔL | 460 | 480 | 110 | >600 | 420 | 440 | 446 | 381 | 380 |
| W | 196 | 180 | 246 | 191 | 168 | 154 | 172 | 201 | 221 |
| Charpy −40° C. | 21 | 21 | 20 | 34 | 138 | 130 | — | — | — |
| Charpy −30° C. | — | — | — | — | — | — | Unbroken | Unbroken | Unbroken |
| Density | 1.044 | 1.043 | 1.039 | 1.089 | 1.02 | 1.016 | 1.037 | 1.032 | 1.035 |

The invention claimed is:

1. A composition comprising:
   from 5 to 50% of at least one polyamide;
   from 45 to 55% of at least one copolymer comprising polyamide blocks and polyether blocks; and
   from 5 to 40% of a single polyolefin, said polyolefin being a polyolefin functionalized by maleic anhydride units or by epoxy units, wherein said polyamide block of said copolymer comprises the same units as the polyamide.

2. The composition as claimed in claim 1, comprising:
   from 10 to 45% of the at least one polyamide;
   from 10 to 35% of the single polyolefin; and
   from 0 to 35% of additives.

3. The composition as claimed claim 1, in which the polyamide is chosen from PA 6, PA 11, PA 12, PA 10.10, PA 10.12, PA 6.10, PA 6.12 and the combinations of these.

4. The composition as claimed in claim 1, in which the polyolefin is chosen from poly(ethylene/propylene)s grafted with maleic anhydride, poly(styrene/ethylene)s grafted with maleic anhydride and poly(ethylene/acrylate)s grafted with maleic anhydride.

5. The composition as claimed in claim 1, in which the copolymer is chosen from copolymers comprising PA 6 blocks and polytetramethylene glycol blocks, copolymers comprising PA BACM.12 blocks and polytetramethylene glycol blocks and the combinations of these.

6. A process for the manufacture of the composition as claimed in claim 1, comprising the provision of the polyamide, of the copolymer and of the single polyolefin and the blending of these.

7. An object manufactured from the composition as claimed in claim 1.

8. A process for the manufacture of the object as claimed in claim 7, comprising the provision of the composition and the forming of the object.

9. A composition consisting of:
   from 5 to 50% of at least one polyamide;
   from 45 to 55% of at least one copolymer consisting of polyamide blocks and polyether blocks;
   from 5 to 40% of a single polyolefin, said polyolefin being a polyolefin functionalized by maleic anhydride units or by epoxy units wherein said polyamide block of said copolymer comprises the same units as the polyamide; and
   from 0 to 35% of additives.

10. The composition as claimed in claim 1, in which the polyamide is a PA 6 and/or in which the copolymer is a copolymer comprising PA 6 and polytetramethylene glycol blocks.

* * * * *